(12) United States Patent
Shuster

(10) Patent No.: US 8,087,616 B2
(45) Date of Patent: Jan. 3, 2012

(54) METHOD AND SYSTEM FOR AVIATION NAVIGATION

(75) Inventor: Gary Stephen Shuster, Fresno, CA (US)

(73) Assignee: Hoshiko, LLC, Henderson, NV (US)

(*) Notice: Subject to any disclaimer, the term of this patent is extended or adjusted under 35 U.S.C. 154(b) by 0 days.

(21) Appl. No.: 13/013,653

(22) Filed: Jan. 25, 2011

(65) Prior Publication Data

US 2011/0118912 A1 May 19, 2011

Related U.S. Application Data

(63) Continuation of application No. 11/550,391, filed on Oct. 17, 2006, now Pat. No. 7,874,521.

(60) Provisional application No. 60/727,637, filed on Oct. 17, 2005.

(51) Int. Cl.
*G05D 1/00* (2006.01)

(52) U.S. Cl. .......................................... 244/175; 244/183

(58) Field of Classification Search .................. 244/175, 244/183, 185, 186, 188; 701/4, 16, 17, 18, 701/201, 202

See application file for complete search history.

(56) References Cited

U.S. PATENT DOCUMENTS

| | | | |
|---|---|---|---|
| 4,538,229 A | 8/1985 | Baltzer et al. | |
| 4,709,336 A | 11/1987 | Zweifel | |
| 5,057,835 A | 10/1991 | Factor et al. | |
| 5,142,480 A * | 8/1992 | Morrow | 701/4 |
| 5,392,052 A | 2/1995 | Eberwine | |
| 5,398,186 A | 3/1995 | Nakhla | |
| 5,842,142 A | 11/1998 | Murray et al. | |
| 6,519,527 B2 | 2/2003 | Shinagawa | |
| 6,573,841 B2 | 6/2003 | Price | |
| 6,804,585 B2 | 10/2004 | Humbard et al. | |
| 2006/0106506 A1 * | 5/2006 | Nichols et al. | 701/3 |

* cited by examiner

*Primary Examiner* — Tien Dinh
*Assistant Examiner* — Richard R Green
(74) *Attorney, Agent, or Firm* — Knobbe, Martens, Olson & Bear LLP

(57) ABSTRACT

A system operates to guide an aircraft to or along a route designed to maintain the aircraft within a safe glide distance of an acceptable emergency landing area. The system uses a database of emergency landing areas with glide characteristics of an aircraft to determine a route that minimizes travel time or other specified parameter, while keeping the aircraft within a safe glide distance of a landing area in the database meeting the landing requirements for the aircraft.

20 Claims, 2 Drawing Sheets

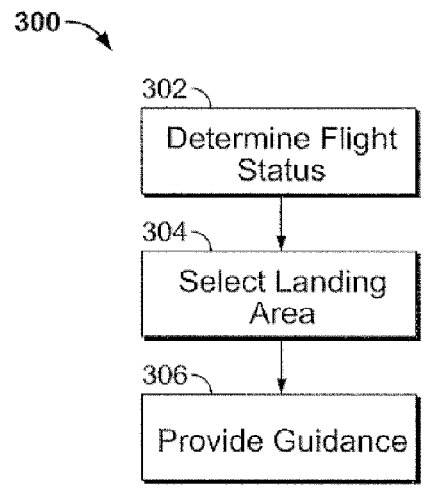
FIG. 3
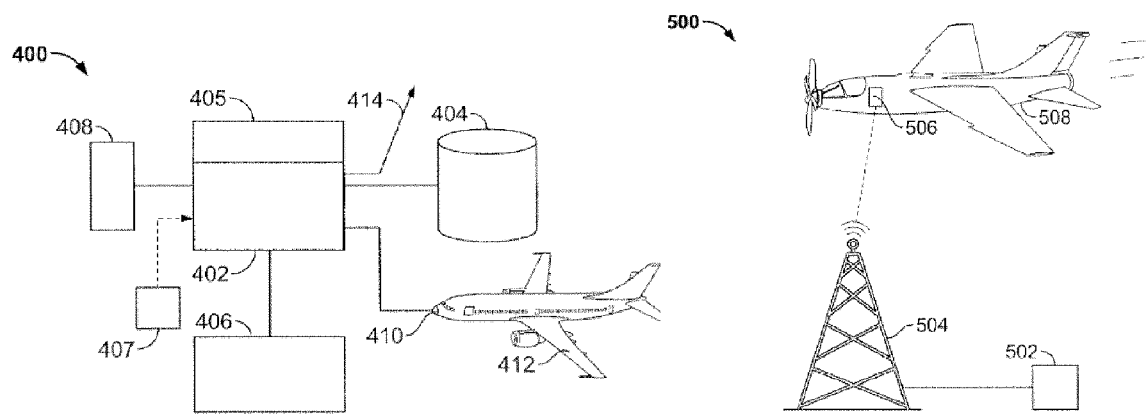
FIG. 4
FIG. 5

METHOD AND SYSTEM FOR AVIATION NAVIGATION

CROSS-REFERENCE TO RELATED APPLICATIONS

This application is a continuation of U.S. patent application Ser. No. 11/550,391, filed on Oct. 17, 2006, which claims priority pursuant to 35 U.S.C. §119(e) to U.S. provisional application Ser. No. 60/727,637, filed Oct. 17, 2006, all of which are specifically incorporated by reference herein, in their entireties.

BACKGROUND OF THE INVENTION

1. Field of the Invention

The present invention relates to computer-aided aircraft navigation methods and systems employing such methods.

2. Description of the Related Art

Currently, aircraft pilots, particularly pilots of small aircraft such as "VFR" aircraft, are permitted significant latitude in choice of flight path and altitude between the origin and destination of a given flight. At the same time, small aircraft are relatively prone to engine failures that require emergency landing under no power. In addition, fuel system malfunctions or leaks, and fuel mismanagement or miscalculations, can impact aircraft of any size. Under the proper weather and landing conditions, small aircraft are designed to be controllable without engine power, and can be glided to a safe landing. Even larger aircraft may be capable of making a survivable landing after suffering a loss or reduction of power. To accomplish a safe landing, it is necessary that an acceptable landing area be available within a defined maximum glide distance of the location where engine failure occurs. The maximum glide distance depends mainly on the glide characteristics of the aircraft, the aircraft altitude when engine failure occurs, aircraft airspeed and altitude at all points of the descent, and altitude, temperature, wind speed and direction.

Under emergency or non-emergency conditions, selection of the best acceptable emergency landing area is rarely trivial, and mistakes can be fatal. The calculation of maximum glide distance is prone to error, and the availability and location of acceptable emergency landing areas is often unknown. The identification of an acceptable landing area can be significantly complicated if the aircraft is in, or above, conditions that obscure or limit the pilot's ability to view the ground, if the aircraft is flying at night, or if the aircraft is over rough terrain. Similarly, if the aircraft is over an area with numerous roads, some of which are acceptable for landing and others are not (for reasons such as power lines crossing the road, insufficient road width and obstacle clearance, etc), or in other conditions, the pilot may incorrectly identify a landing target only to determine, when he is too close to the ground to pick another target, that the intended landing target is not in fact safe. Current navigation equipment does not adequately assist aircraft pilots in the selection of emergency areas, in the event of engine failure.

Furthermore, a pilot in an emergency landing situation often is in the position of being able to make only one approach to the landing site. If the pilot picks the wrong glideslope, approach speed, or other aspects of the approach, the pilot may overshoot or undershoot the target. While the likelihood of such a "miss" is increased in poor visibility or significant wind conditions, it is present even in clear weather as pilots rarely practice "power-off" landings all the way from a cruise altitude to the ground.

In addition, prudent flight planning would plot a course and altitude so as to keep the aircraft, to the extent possible, within a safe gliding distance of an emergency landing area at all times during the flight. However, the information gathering and calculation required to perform this task are too burdensome to permit detailed consideration of emergency landing in flight planning. Pilots therefore miss opportunities to navigating aircraft so as to minimize the likelihood that an emergency landing will not be successful. It would be desirable, therefore, to provide a tool whereby the chances of a successful emergency landing may be improved via prudent navigation.

SUMMARY OF THE INVENTION

The present invention provides a method and system whereby pilots may take greater account of emergency landing areas in the navigation of aircraft, including both in pre-flight planning and in-flight modifications. A system according to the invention may operate to navigate aircraft along a flight path that minimizes flight time or fuel consumption, while keeping the aircraft within a safe gliding distance of at least one emergency landing area at all times during the flight, or during some specified percentage of flight time. The system may, in the alternative or in addition, keep the aircraft within a defined distance of other locations along the route, or plan a route to maintain the plane within a glide distance of emergency landing areas, and prohibited, restricted, or otherwise limited airspace.

Emergency landing areas may be classified according to their desirability for emergency landing. More desirable areas, such as operating or abandoned airstrips, may be given a higher classification, and less desirable areas, such as open fields or roadways, may be given a lower classification. A system according to the invention can be configured, for example, to select only landing areas exceeding some threshold of classification for use as potential emergency landing areas. In the alternative, the system may select landing areas in a priority order determined at least in part from their respective classifications.

The system may also gather aircraft-specific information for use in navigation, including glide characteristics, such as the rate of descent at various airspeeds and in various aircraft gear, flap, and other configurations and varying payload weights for various models of aircraft, and the range of operable airspeeds under glide conditions. In addition, the aircraft landing requirements may also be gathered, such as the minimum landing strip length needed for landing, the minimum obstacle clearance required on approach, and the minimum width required to accommodate the wingspan. Optionally, aircraft fuel consumption characteristics may be gathered and maintained for use in planning fuel-efficient routes. The system should also be provided with current weather conditions, especially current wind speed and direction at the current aircraft location and at point on or near an anticipated flight path. These information aspects of the navigational system may be maintained and stored on a regional or national basis so as to be available generally to all users of the system.

Prior to beginning a flight, a pilot may access the system to request a safe flight plan between a starting location, or origin, and a destination. Optionally, the pilot may specify other desired parameters, for example, such as a desired margin of error for safe landing, a percentage of total flight time during which the aircraft should be kept within a glide range of an emergency landing area of specified class, a desired minimum or maximum cruising altitude, whether a route should be based on minimum flight time or minimum fuel consumption, and/or custom glide characteristics for a particular aircraft.

A computer may then be used to calculate a route, include both direction and altitude, that maintains the desired level of proximity to emergency landing areas while achieving minimum flight time or fuel consumption. Various error minimization algorithms are known in the art, and any suitable algorithm may be employed. A suitable algorithm should take into account the pertinent aforementioned parameters to determine a route between the origin and destination that minimizes travel time or fuel consumption, given the constraint that the aircraft remain within a glide distance of an emergency landing area for a specified percentage (e.g., 100% or 90%) of the flight.

Part of this calculation may involve selecting the acceptable landing areas between the origin and destination, using the database of emergency landing areas, the aircraft-specific landing requirements, the glide characteristics of the aircraft under the anticipated payload conditions, and the projected weather conditions on emergency approach to and during landing at the target landing area at a projected time of the in-flight power loss. In an embodiment of the invention, the suitable landing areas that are located most closely along a straight line, optimal route may be located, and the route adjusted to maintain a safe glide distance from these sites. If the desired percentage of the route is not within a glide distance of a landing area, then additional landing areas may be sought to cover portions of the route, or the aircraft altitude may be increased, or some combination of the foregoing.

In an alternative embodiment of the invention, or in addition, the planning software may attempt to keep the aircraft within areas of radar coverage, within areas that air traffic control may provide services, within areas of radio coverage, within published airways, within accepted VFR or IFR routes, or with some combination of the foregoing. Other selection methods may also be suitable.

As a preflight planning system, the foregoing may be entirely ground-based. For example, it may be operated on a network accessible via an Internet website. In an embodiment of the invention, some portion of the system may be placed in a portable device for in-flight use. This permits use of the system for in-flight travel modifications.

In addition, or in the alternative, an "emergency" function may be provided to an in-flight system such as a GPS navigation system. Activating the emergency system will cause the system to calculate one or more acceptable emergency landing areas, given the current aircraft location and altitude, under current or anticipated weather conditions. If no landing areas of the highest classification are available, the system may find the nearest landing area of the highest available classification, and direct the pilot toward that location. Optionally, the navigation system guides the pilot to the landing area by providing course vectors and required minimum and maximum descent rates. The system optionally warns the pilot how long the best glide speed must be maintained, sends an emergency signal optionally containing aircraft coordinates, or optionally tunes the radio to appropriate frequencies for emergency reporting or the destination airstrip. The system optionally integrates with an autopilot and/or autothrottle to provide aircraft control. The system optionally integrates with a glideslope instrument or provides a digital simulated glideslope, that the pilot may follow in the same manner that pilots are using to following on a precision landing approach.

A more complete understanding of the method and system for aircraft navigation will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3 is a flow chart showing exemplary steps of an emergency navigation method according to an embodiment of the invention.

FIG. 4 is a schematic diagram showing aspects of an exemplary emergency navigation system according to an embodiment of the invention.

FIG. 5 is a schematic diagram showing aspects of an exemplary information updating system according to an embodiment of the invention.

DETAILED DESCRIPTION OF THE PREFERRED EMBODIMENT

Figure 1:
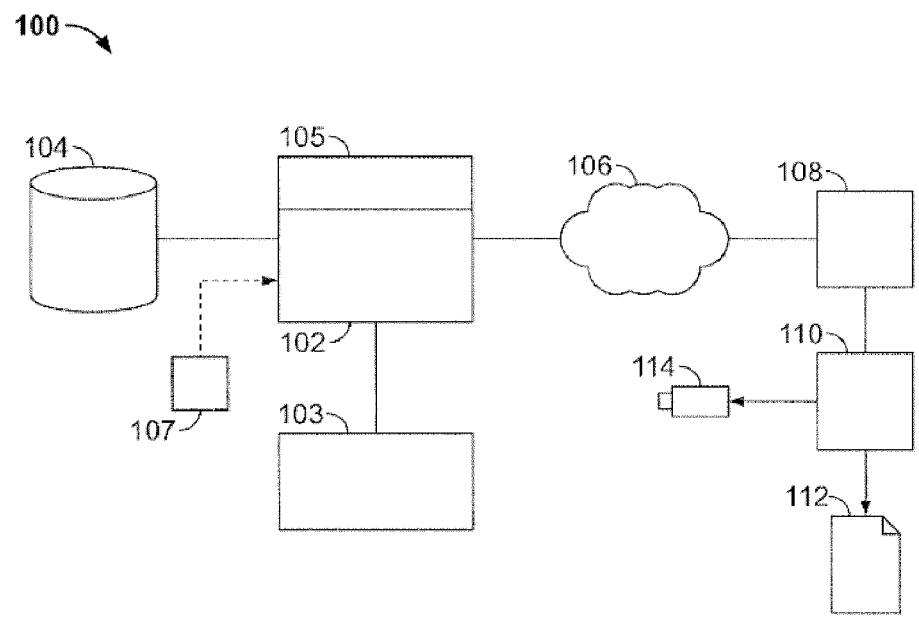
FIG. 1 is a schematic diagram showing aspects of an aircraft navigation system according to an embodiment of the invention.

In the detailed description that follows, like element numerals are used to indicate like elements appearing in one or more of the figures. FIG. 1 is a schematic diagram showing aspects of an aircraft navigation system 100 according to an embodiment of the invention. It should be appreciated that the invention may be implemented on any suitable computing platform.

In an embodiment of the invention, navigation system 100 comprises a computer 102 operatively associated with a database 104. Database 104 may contain data describing the location and characteristics of emergency landing area. Data concerning landing areas may be gathered in advance using various manual or semi-automatic data. Such data may include the geographic location of the landing area, elevation, length and orientation of landing strips, surface type (i.e., pavement, gravel, grass, water), use type (airstrip, abandoned airstrip, roadway, field, lake, etc.), and any other information useful for selecting or using a landing area. In an embodiment of the invention, topological maps may be scanned to select candidate landing areas, which are then screened to select useful landing areas for inclusion in the database. Each landing area may be assigned a classification to indicate its desirability as a landing area, for example, class 'A,' class 'B,' etc. Once the database has been populated with such data, it should be periodically checked and updated as needed to maintain accurate information. Generally, however, data concerning emergency landing areas should not be expected to change rapidly. Database 104 may also store completed flight plans between defined destination, for re-use or modification in the future. Database 104 may be constructed and operated in any suitable manner known in the art of computer databases.

Computer 102 may comprise a memory 105 holding program instructions for operating the system to perform steps of the invention, described hereinbelow. The computer may also be provided with a local user interface 103 configured for accessing and maintaining database 104, and for operating, configuring, or maintaining one or more programs for performing aviation navigation as disclosed herein. Computer 102 may be operated as a stand-alone system with all activity performed locally. In an embodiment of the invention, however, computer 102 may be connected via a network 106, such as a wide-area or local-area network, to a plurality of client computers, one client 108 of many shown.

It should be understood that a "computer," "computer module," or "computer circuit" as used herein should be taken to mean any operable combination of hardware, software, or firmware for performing a computing function. For example, a computer may comprise a general-purpose computer comprising hardware, a low-level operating system in firmware, and applications and a high-level operating system in software stored in non-volatile memory. For further example, a computer may comprise special purpose hardware and firmware, or some combination of firmware and software. Instructions for performing actions as disclosed herein may be implemented in a computer as firmware, hardware, software, or as any operable combination of firmware, hardware, or software. Various operable combinations should be apparent to one of ordinary skill, in light of the present disclosure.

Client 108 and host 102 may communicate in any suitable fashion as known in computing networking. In an embodiment of the invention, communication may occur primarily through World Wide Web pages. Client 108 may be used to fill information in forms provided from host 102, which is then used in flight planning. Completed flight plans may be accessed via a Web page served from the host. In an alternative embodiment, client 108 and host 102 may establish any other communication link, and client 102 may be used to operate a client interface that exchanges information with the host 106.

Client 108 may be connected to an output device 110, such as, for example, a display screen, printer, or removable memory port. The output device may be used to output information defining an flight plan for use in flight. In an embodiment of the invention, a printed flight plan 112 is prepared. In the alternative, or in addition, the flight plan may be written to a portable memory 114, such as a USB-enabled non-volatile memory chip, and optical media disk, or a magnetic media disk. The portable memory may be connected to a navigation system in the aircraft, which, in turn, may generate a navigational display or audio output during the flight to guide the pilot along the generated flight path. For example, a navigation system may generate audible commands and a map showing the path and position of the aircraft for guiding the pilot to the planned destination along a flight path recorded on memory 114. In the alternative, computer 108 may be an on-board system in communication via a wireless link to host 102, and generate navigational audio and/or visual output directly in the aircraft cabin. In yet another alternative embodiment, host 102 and client 108 are integrated with database 104 in an on board computer system.

Software comprising instructions for performing steps of the methods described herein may be encoded in a computer-readable medium 107, such as a magnetic disk or tape, optical disk, or memory chip. When connected to computer 102, these instructions may be read into an operating memory of the computer, enabling performance of the methods described herein. Medium 107 may be a portable medium, may be permanently installed within a housing of the computer, or otherwise configured in any suitable fashion.

Figure 2:
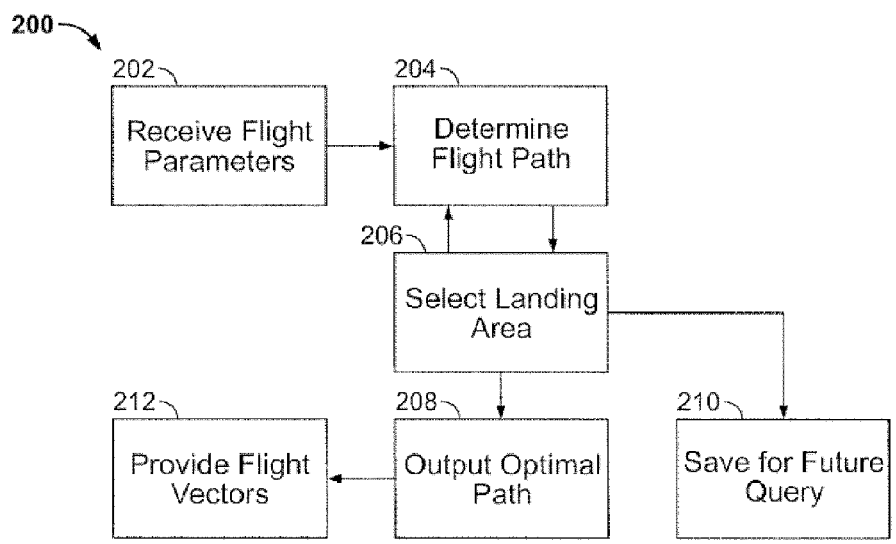
FIG. 2 is a flow diagram showing exemplary steps of a method according to an embodiment of the invention.

System 100 may be used to perform a method of navigating an aircraft as shown in FIG. 2. At an initial step, the system receives the desired parameters for a flight plan. These parameters may include a desired origin (i.e., starting location) and destination for the flight. The origin and destination may be defined in any suitable fashion, for example by FAA standard 3-letter airport codes, latitude/longitude of the origin or destination, street address, or by any other suitable description. Other flight parameters to be specified by a pilot or flight planner, and received by system 100, may include a departure time and a percentage or percentages of time to remain within a safe glide radius of an emergency landing area. Different percentages may be specified to obtain different flight plans; for example, a pilot may specify a first plan using parameters of 90% of time within glide range of a Class 'A' landing area (e.g., airport or abandoned airstrip) and 10% of time within glide range of the best available alternative landing area, leading to a first flight plan. Specifying different parameters, for example, 50% of time within a glide range of a Class 'A' landing area and 50% of time within a Class "R" (e.g., paved roadway) landing area may lead to a very different flight plan for the same flight.

Other parameters that may be specified, and that may be important in the selection or use of a landing area, may also be specified. Such parameters may include, for example, the type or model of aircraft that will be used in the flight. In an embodiment of the invention, glide characteristics and landing requirements for various models of aircraft under different conditions may be maintained in the system database to ease the chore of configuring the system for a particular aircraft and flight. In the alternative, or in addition, glide characteristics and landing requirements may be entered manually. This information may include, for example, the range of glide speeds the plane is capable of under various conditions, such with or without landing gear extended, etc, the best glide speed, the rate of descent at different glide speeds and payloads, the maximum cruising altitude, maximum airspeed, and so forth. Other parameters may include the amount of fuel on board, the weight of other payload on board, acceptable terrain for landing, wingspan, minimum landing length needed, or other pertinent data. In an embodiment of the invention, a flight planner may also specify whether the flight plan should be optimized for shortest possible time, least possible fuel consumption, or any other desired parameter. Flight parameters, in general, may be manually entered or selected from a database based on other criteria entered into the system.

After flight parameters have been sufficiently specified, a system computer may begin processing the received data to determine a flight path and select landing areas, as shown by steps 204 and 206. These processes may be performed concurrently or iteratively to achieve a flight plan that achieves the required parameters for the flight.

Various algorithms may be used. For example, the computer may begin by selecting a straight line path between the origin and destination, locating emergency landing areas within a defined distance of the path, re-defining a plan within a glide range of the emergency landing areas, testing to see if the flight parameters are satisfied, and if not, locating additional landing areas and continuing this process until all flight conditions are satisfied. In determining a flight path between the origin and destination, the flight path may be calculated to maintain the aircraft within glide range of least one acceptable emergency landing area along different defined portions of the flight path, based on the glide characteristics and locations of acceptable emergency landing areas generally between the origin and destination. As used herein, "generally between the origin and destination" should be taken to mean "within a glide range of a flight path between the origin and destination."

In an embodiment of the invention, the flight path may be defined first and best available emergency landing areas selected along the route. In this embodiment, a pilot may be permitted to define a flight path, with the computer merely locating the best available emergency landing areas, and indicating the portions of the flight path that are not within a glide range of a landing area. Still another approach is to permit a pilot to manually define an envelope for the flight path, and then defining an optimal flight path within the defined envelope via an iterative process. Landing areas may be selected based on the aircraft emergency landing requirements, landing preferences indicated by a pilot, and the characteristics of the emergency landing areas as recorded in the database. Once the locations of suitable landing areas have been identified between the origin and destination, defining an optimal path between the location and destination may be performed by any suitable path-finding algorithm.

Once a flight plan meeting the specified criteria has been defined, it may be presented to the user at step 208, for example by preparation of a written map and plan that may be printed out or displayed on a screen. The flight planner may inspect the plan and, if the plan is not to her liking, adjust the criteria to define an alternative flight plan. Once a flight plan has been accepted by the user, the plan may be saved for future reference at step 210. As previously noted, a flight plan may be output in electronic form, for use by an on-board navigation system. At step 212, an onboard navigation system may use the flight plan to develop and provide vectors to the pilot, to guide and maintain the aircraft along the planned flight path.

In an embodiment of the invention, a pilot is guided to an emergency landing area at any point during a flight, such as when engine failure or other equipment failure occurs, or for training purposes. FIG. 3 is a flow chart showing exemplary steps of an emergency navigation method 300 according to the invention. At step 302, flight status is determined when the method is activated. The method may be activated, for example, when a pilot selects an emergency button or other indicator, power failure is sensed, or any other event occurs that the system has been configured to recognize. Determination of flight status may comprise, for example, receiving a current altitude, location, glide characteristics and landing requirements for an aircraft. Generally, the glide characteristics and landing requirements for an aircraft should be maintained in an on-board memory of the emergency system. The current location and altitude may be determined from a GPS device or other locating system. Other parameters may also be received, for example the current weather conditions, such as average wind speed and direction, fuel level, whether or not the landing gear is retracted, and any other parameter useful for guiding the aircraft to an emergency landing area.

At step 304, an on-board computer may select a nearest acceptable landing area from a database of landing areas meeting the landing requirements and within glide range. Once the current equipment status, wind speed and direction, and altitude are known, the glide radius in various directions may be calculated. The system may select any number of emergency landing areas located in the glide radius, and prioritize them according to suitability for an emergency landing, distance from current location, and pilot preferences for landing areas, if any. One or more of the highest-priority emergency landing areas may be selected. Selection may occur automatically or semi-automatically. For example, a default landing area may be selected by the computer and presented to the pilot with alternative landing areas, and the pilot may select any acceptable landing area within the glide radius.

Once the landing area is selected, the emergency navigation system may provide a location and description of the nearest acceptable landing area. Subsequently, the navigation system may provide vectors and required descent speed to guide the pilot to the landing area, including course corrections as necessary to kept the aircraft on an optimal glide path. The navigation system may also provide a signal to display to confirm that the aircraft is maintaining a proper glide path and course. Optionally, via a connection to an autopilot system, the emergency navigation system may fly the plane to the emergency landing area for as long as the pilot desires.

In an embodiment of the invention, the navigation system may broadcast an emergency signal comprising current coordinates and location of the selected landing area. This may be useful to alert other pilots in the vicinity and the airstrip controllers, if any, that a plane is gliding in for a landing under emergency conditions.

Method 300 may be implemented by any suitable onboard system. FIG. 4 is a schematic diagram showing aspects of an exemplary emergency navigation system 400 according to the invention. System 400 comprises a computer 402 having a memory 405 holding instructions for performing steps according to the invention. The computer is operatively associated with a database 404 of emergency landing areas. The database may be updated periodically via a wireless connection or other media update process. Database 404 may also hold information describing the glide characteristics of the aircraft, and its emergency landing requirements. Software comprising instructions for performing steps of the methods described herein may be encoded in a computer-readable medium 407, such as a magnetic disk or tape, optical disk, or memory chip. When connected to computer 402, these instructions may be read into an operating memory of the computer, enabling performance of the methods described herein.

Computer 402 may be connected to a display device 406, used to provide visual and/or audible guidance to the pilot, to guide the pilot towards a selected emergency landing area. Computer 402 may also receive input from one or more sensors 410 associated with the aircraft 412, for example, airspeed indicators and fuel level sensors. The computer may also receive data via one or more antennae's 414. For example, the computer may be able to receive weather information regarding the anticipated glide path via a radio configured to receive, and optionally to send, data to transmitter/receiver for a weather monitoring service.

Computer 402 may further be connected to an autopilot controller 408 for automatically guiding the plane to the emergency landing area. Optionally, the computer may send the autopilot information for maintaining the aircraft 412 on the proper glide path needed to safely land at the selected emergency landing area.

Computer 402 may further be connected to an autopilot controller 408 for automatically guiding the plane to the emergency landing area. Optionally, the computer may send the autopilot information for maintaining the aircraft 412 on the proper glide path needed to safely land at the selected emergency landing area.

It may be advantageous to periodically update data available to a portable navigation system such as described above. Updating may be accomplished, for example, via a ground based data system 500, as shown in FIG. 5. System 500 comprises a computer 502 through which a human operator, or an automatic software agent, may obtain and verify updated or new information regarding parameters used in navigation. As previously described, these parameters may include information regarding emergency landing areas, weather data, or other information that tends to change with time. The administrative computer may transmit updated information via a transmitter 504 to a navigation system 506 located in an aircraft 508. In the alternative, all or a portion of the navigation system may be located in a ground-based system, such as system 100 described above. Upon receiving the new or updated information, the navigation system updates associated database areas, and the new or updated information may thereafter be used in navigation flight planning or in emergency navigation.

Having thus described various embodiments of the system and method for aircraft navigation, it should be apparent to those skilled in the art that certain advantages of the within system have been achieved. It should also be appreciated that various modifications, adaptations, and alternative embodiments thereof may be made within the scope and spirit of the present invention, which is not limited to the described embodiments. It should be understood that "the invention" as used herein should be taken to mean "an embodiment of at least one of the inventions described herein," and thus may be taken as including the plural "inventions" and as not requiring any particular aspect or embodiment of the inventions disclosed.

What is claimed is:

1. A method comprising:
    receiving, by a computing device, glide characteristics and landing requirements for an aircraft, the landing requirements comprising an indication of one or more acceptable landing site types;
    in response to receiving an indication of an emergency from a user of the computing device, selecting, by the computing device, a nearest acceptable landing area from a database of acceptable landing areas including at least one acceptable landing area that is not part of an airport or an airstrip, wherein the nearest acceptable landing area meets the landing requirements for the aircraft and is within a glide range of the aircraft; and
    providing to the user, by the computing device, a location of the nearest acceptable landing area.

2. The method of claim 1, wherein the acceptable landing site types are selected from a group comprising airstrips, abandoned airstrips, roads, fields, and water.

3. The method of claim 1, further comprising providing vectors to guide the aircraft to the nearest acceptable landing area.

4. The method of claim 1, further comprising providing a required descent speed to guide the aircraft to the nearest acceptable landing area.

5. The method of claim 1, further comprising providing an emergency signal comprising current coordinates of the aircraft and the location of the nearest acceptable landing area.

6. The method of claim 1, wherein selecting the nearest acceptable landing area comprises automatically selecting a preferred landing area when multiple acceptable landing areas are within the glide range of the aircraft, based on one or more characteristics of the multiple acceptable landing areas or user preferences.

7. The method of claim 1, wherein the computing device is coupled to at least some controls of the aircraft and is configured to cause the aircraft to implement an emergency flight path to the nearest acceptable landing area.

8. The method of claim 1, wherein the computing device is integrated with an autopilot or an autothrottle system of the aircraft.

9. The method of claim 1, wherein the computing device is integrated with a glidescope or a simulated glidescope of the aircraft.

10. The method of claim 1, wherein the database of acceptable landing areas is stored in a storage medium of the computing device.

11. The method of claim 1, wherein updates to the database of acceptable landing areas are wirelessly received from a ground-based computing system.

12. The method of claim 1, wherein selecting the nearest acceptable landing area comprises presenting multiple acceptable landing areas to a pilot of the aircraft and receiving a selection of at least one of the multiple acceptable landing areas from the pilot.

13. A computing system comprising:
    a non-transitory computer readable medium storing machine-executable instructions configured for execution by the computing system in order to cause the computing system to:
        receive landing requirements for an aircraft, the landing requirements comprising an indication of one or more acceptable landing site types;
        select a nearest acceptable landing area from a database of acceptable landing areas meeting the landing requirements and within a glide range of the aircraft, in response to receiving an indication of an emergency from a user of the computing system, wherein at least one of the acceptable landing areas is not part of an airport or an airstrip; and
        provide a location of the nearest acceptable landing area.

14. The computing system of claim 13, wherein the instructions are further configured to cause the computing system to provide vectors to guide the aircraft to the nearest acceptable landing area.

15. The computing system of claim 13, wherein the instructions are further configured to cause the computing system to select the nearest acceptable landing area by automatically selecting a preferred landing area when multiple acceptable landing areas are within the glide range of the aircraft, based on one or more characteristics of the multiple acceptable landing areas or user preferences.

16. The computing system of claim 13, wherein the computing system is integrated with an autopilot or an autothrottle system of the aircraft.

17. The computing system of claim 13, wherein the computing system is integrated with a glidescope or a simulated glidescope of the aircraft.

18. A non-transitory computer-readable medium encoded with instructions thereon, wherein the instructions are readable by a computing device in order to cause the computing device to perform operations comprising:
    receiving glide characteristics and landing requirements for an aircraft, the landing requirements comprising an indication of one or more acceptable landing site types;
    in response to receiving an indication of an emergency from a user of the computing device, selecting a nearest acceptable landing area from a database of acceptable landing areas including at least one acceptable landing area that is not part of an airport or an airstrip, wherein the nearest acceptable landing area meets the landing requirements for the aircraft and is within a glide range of the aircraft; and
    providing a location of the nearest acceptable landing area.

19. The non-transitory computer-readable medium of claim 18, wherein the operations further comprise providing vectors to guide the aircraft to the nearest acceptable landing area.

20. The non-transitory computer-readable medium of claim 18, wherein the computing device is integrated with an autopilot or an autothrottle system of the aircraft.

* * * * *

UNITED STATES PATENT AND TRADEMARK OFFICE
CERTIFICATE OF CORRECTION

PATENT NO. : 8,087,616 B2 Page 1 of 1
APPLICATION NO. : 13/013653
DATED : January 3, 2012
INVENTOR(S) : Shuster It is certified that error appears in the above-identified patent and that said Letters Patent is hereby corrected as shown below:

ON THE TITLE PAGE:
Item (73), under "Assignee", in Column 1, Line 1, delete "Hoshiko, LLC," and insert
-- Hoshiko LLC, --, therefor.

IN THE CLAIMS:
In Column 10, Line 10, in Claim 13, delete "computer readable" and insert -- computer-readable --, therefor.

Signed and Sealed this
Nineteenth Day of June, 2012

David J. Kappos
*Director of the United States Patent and Trademark Office*